Oct. 13, 1931.  A. BRANCART  1,827,138
PROCESS OF AND APPARATUS FOR ROLLING GLASS
Filed Feb. 14, 1930
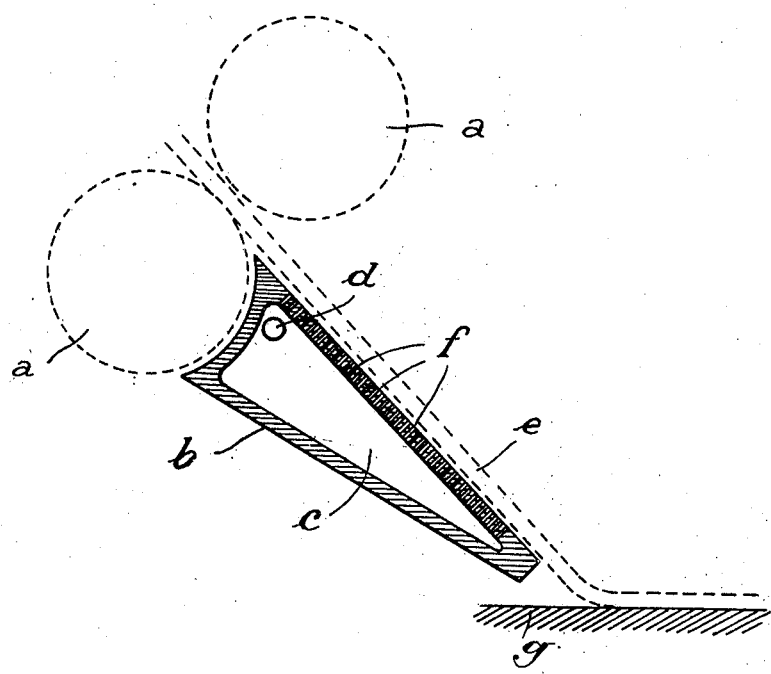
A. Brancart
INVENTOR
By: Marks & Clare
Attys.

Patented Oct. 13, 1931

1,827,138

UNITED STATES PATENT OFFICE

ARTHUR BRANCART, OF RONQUIERES, BELGIUM

PROCESS OF AND APPARATUS FOR ROLLING GLASS

Application filed February 14, 1930, Serial No. 428,444, and in Belgium February 23, 1929.

This invention relates to glass rolling trains in which the sheet of glass, after it has been rolled and stretched out by the rolls, is received on a plate whereby it is supported and guided to the receiving table. The main object of the invention is to prevent friction taking place between this receiving guide plate and the glass sheet, which may be injurious to the evenness of the latter, and a subsidiary object is to simultaneously obtain a re-burning of the under surface of the glass, which improves the polish given to it by rolling.

To this effect, the receiving guide according to the invention is made hollow and its glass receiving face is provided with a large number of perforations, through which air or a gas, supplied under pressure within the plate, can escape thus forming between the latter and the glass a cushion which prevents contact and consequently friction. The gas used may be combustible, and in this case it is ignited by the heat of the glass, which thus is subjected to re-burning when sliding over the plate. The air or gas employed is preferably damp, in order that the cushion shall contain steam, the action of which has been found to be favourable.

The accompanying drawing shows diagrammatically a receiving guide plate embodying an example of the manner in which the invention may be performed.

In this drawing, a indicates the rolls behind which is mounted the hollow plate b. The inner chamber c of the latter is connected by a piping d with a suitable source of air or gas under pressure, which can escape between the guide and the glass sheet e through a number of openings f of very small cross-sectional area provided in the upper side of the chamber c. g is the receiving table on which the glass sheet comes to rest.

I claim:

1. A process of delivering rolled glass comprising rolling the glass in a plastic condition, sliding the glass over an inclined surface, and injecting a gas under pressure under the sliding glass through perforations in said surface over the whole length of its travel thereon, thus forming a gaseous cushion and preventing direct contact between said surface and the sliding glass.

2. A process of delivering rolled glass comprising rolling the glass in a plastic condition, sliding the glass over an inclined surface, and injecting moist gas under pressure under the sliding glass through perforations in said surface, thus forming a steam cushion between said surface and the sliding glass.

3. A process of delivering rolled glass comprising rolling the glass in a plastic condition, sliding the glass over an inclined surface, and injecting fuel gas under pressure under the sliding glass through perforations in said surface over the whole length of its travel thereon thus re-burning the under side of the glass and preventing direct contact between said surface and the sliding glass.

4. In apparatus for the manufacture of glass plates and sheets, the combination of a pair of rolls for rolling glass in a plastic condition, a receiving table, an inclined guide plate between said rolls and said table, the permanent inclination of said plate being such that the glass will not stay thereon, said plate being hollow and having a perforated upper surface, the perforations in said surface being distributed over the whole length thereof, and a gas supply pipe opening into the inside of said plate.

ARTHUR BRANCART.